(12) United States Patent
Sharma et al.

(10) Patent No.: US 7,277,474 B2
(45) Date of Patent: Oct. 2, 2007

(54) FINGER ALLOCATION FOR A PATH SEARCHER IN A MULTIPATH RECEIVER

(75) Inventors: Abhay Sharma, Wakefield, MA (US); Zoran Zvonar, Boston, MA (US); Deepak Mathew, North Billerica, MA (US); Aiguo Yan, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 984 days.

(21) Appl. No.: 10/625,479

(22) Filed: Jul. 23, 2003

(65) Prior Publication Data

US 2004/0139466 A1    Jul. 15, 2004

Related U.S. Application Data

(60) Provisional application No. 60/423,831, filed on Nov. 5, 2002.

(51) Int. Cl.
*H04B 1/707* (2006.01)

(52) U.S. Cl. ................................ 375/148

(58) Field of Classification Search ........ 375/147–150, 375/152; 370/320, 335, 342, 441
See application file for complete search history.

(56) References Cited

U.S. PATENT DOCUMENTS 6,618,434 B2 * 9/2003 Heidari-Bateni et al. ... 375/148

2003/0095530 A1 * 5/2003 Lin ............................ 370/342
2004/0053592 A1 * 3/2004 Reial ......................... 455/303
2004/0072553 A1 * 4/2004 Wang et al. ................ 455/334
2004/0120386 A1 * 6/2004 Grilli et al. ................ 375/148

OTHER PUBLICATIONS

Fukumoto, et al., *Path Search Performance and Its Parameter Optimization of Pilot Symbol-Assisted Coherent Rake Receiver for W-CDMA Mobile Radio*, IEICE Trans. Fundamentals, vol. E83, No. 11, Nov. 2000, pp. 2110-2118.
Zhenhong, et al., *Tap Selection Scheme in a W-CDMA System over Multipath Fading Channels*, ICCT'98, Oct. 22-24, 1998, pp. 405-409 vol. 1.

(Continued)

*Primary Examiner*—Don N. Vo
(74) *Attorney, Agent, or Firm*—Bromberg & Sunstein LLP

(57) ABSTRACT

A technique for allocating fingers in a path searcher of a multipath receiver involves determining a required number of fingers for each multipath region, determining a number of allocated fingers for each multipath region according to an area-based weighting scheme such that each multipath region that is allocated fewer than its required number of fingers is deemed to have a non-zero residual area, allocating any surplus fingers to multipath regions having non-zero residual areas until either no surplus fingers remain or each multipath region is allocated its required number of fingers, and placing any fingers allocated to each multipath region within the multipath region. Placing the fingers in unresolvable path scenario involves detecting path location at the edges of multipath region; placing fingers at the edges and placing remaining fingers uniformly between the first and the last path such that the there is a minimum placement separation between the fingers.

25 Claims, 8 Drawing Sheets

OTHER PUBLICATIONS

Hamada, et al., *Performance Evaluation of the path search process for the W-CDMA System,* VTC, 1999 IEEE 49th; vol. 2, 1999, pp. 980-984.

Baier, et al., *Design Study for a CDMA-based third generation mobile radio system,* IEEE JSAC, vol. 12, No. 4, May 1994, pp. 733-743.

J.E. Mazo, *Exact Matched Filter Bound for Two-Beam Rayleigh Fading,* IEEE Transactions on Communications, vol. 39, Non 7, Jul. 1999, pp. 1027-1030.

Schulz-Rittich, et al., *Low Complexity Adaptive Code Tracking with Improved Multipath Resolution for DS-CDMA Communications over Fading Channels,* IEEE 6th Int. Symp. On Spread-Spectrum Tech. & Appli. NJIT, New Jersey, USA, Sep. 6-8, 2000, pp. 30-34.

Aue, et al., *A Non-Coherent Tracking Scheme for the RAKE Receiver That Can Cope With Unresolvable Multipath,* IEEE ICC'99, vol. 3, pp. 1917-1921.

Bottomley, et al., *Optimizing the performance of limited complexity Rake receivers,* VTC 98. 48th IEEE, vol. 2, 1998, pp. 968-972.

Vejlgaard, et al., *Grouped Rake Finger Management Principle for Wideband CDMA,* VTC 2000, pp. 87-91.

A. J. Viterbi, *CDMA: Principles of Spread Spectrum Communication,* Addison-Wesley, 1998.

* cited by examiner

US 7,277,474 B2

FINGER ALLOCATION FOR A PATH SEARCHER IN A MULTIPATH RECEIVER

PRIORITY

This patent application claims priority from U.S. Provisional Patent Application No. 60/423,831 filed Nov. 5, 2002, which is hereby incorporated herein by reference in its entirety.

FIELD OF THE INVENTION

The present invention relates generally to RAKE receivers for W-CDMA systems, and more particularly to a finger allocation algorithm for a path searcher unit in a RAKE receiver.

BACKGROUND OF THE INVENTION

A RAKE receiver is a key technology for implementing W-CDMA systems because of its ability to combat multipath fading. In a wireless medium, the transmitted signal arrives at the receiver via different paths, each having a different (and time-varying) propagation delay and attenuation. The relatively high bandwidth of W-CDMA signal, as compared to the coherence bandwidth of the channel, allows the different multipaths to be resolved. A RAKE receiver combines the signal received from various resolvable paths to provide a diversity gain that results in an improved performance. Thus, to utilize the full diversity, it is important to detect all the resolvable paths with sufficiently high signal-to-interference plus background noise power ratio (SIR).

Path searching is generally defined as the process of determining the position of various multipaths. A path searcher enables the RAKE receiver to coherently combine paths with sufficiently high SIR to achieve diversity gain.

Some additional information regarding CDMA systems in general, and path searchers and RAKE receivers in particular, is provided by the following references, which are all hereby incorporated herein by reference in their entireties, and are referenced throughout the specification using the reference number in brackets:

[Ref 1] S. Fukumoto, K. Okawa, K. Higuchi, M. Sawahashi, F. Adachi, "Path Search Performance and Its Parameter Optimization of Pilot Symbol-Assisted Coherent Rake Receiver for W-CDMA Mobile Radio", IEICE Trans. Fundamentals, Vol E83, No. 11, Nov. 2000, pp. 2110-2118.

[Ref 2] Li Zhenhong, A. Mammela, "Tap Selection Scheme in a W-CDMA System over Multipath Fading Channels", ICCT'98, Oct. 22-24, 1998, pp. 405-409 vol 1.

[Ref 3] H. Hamada, M. Nakamura, T. Kubo, M. Minowa, Y. Oishi, "Performance Evaluation of the path search process for the W-CDMA System", VTC, 1999 IEEE 49$^{th}$, Vol 2, 1999, pp. 980-984.

[Ref 4] A. Baier, U. Fiebig, W. Granzow, W. Koch, P. Teder and J. Thielecke, "Design Study for a CDMA-based third generation mobile radio system", IEEE JSAC, Vol 12, No. 4, May 1994, pp. 733-743.

[Ref 5] A. J. Viterbi, "CDMA: Principles of Spread Spectrum Communications", Addison-Wesley, 1998.

[Ref 6] J. E. Mazo, "Exact Matched Filter Bound for Two-Beam Rayleigh Fading", IEEE Transactions on Communications, Vol. 39, Non 7, Jul. 1991, pp. 1027-1030.

[Ref 7] P. Schulz-Rittich, Gunnar Fock, J. Baltersee and Heinrich Meyr, "Low Complexity Adaptive Code Tracking with Improved Multipath Resolution for DS-CDMA Communications over Fading Channels", IEEE 6$^{th}$ Int. Symp. On Spread-Spectrum Tech. & Appli. NJIT, New Jersey, USA, Sep. 6-8, 2000, pp. 30-34.

[Ref 8] Volker Aue and Gerhard P. Fettweis, "A Non-Coherent Tracking Scheme for the RAKE Receiver That Can Cope With Unresolvable Multipath", IEEE ICC'99, Vol. 3, pp. 1917-1921.

[Ref 9] Gregory E. Bottomley, Essam Sourour, R. Ramesh and S. Chennakeshu, "Optimizing the performance of limited complexity Rake receivers", VTC 98. 48$^{th}$ IEEE, Vol 2, 1998, pp. 968-972.

[Ref 10] Benny N. Vejlgaard, Proben Mogensen and Jasper B. Knudsen, "Grouped Rake Finger Management Principle for Wideband CDMA", VTC 2000, pp. 87-91.

SUMMARY OF THE INVENTION

Various embodiments of the invention provide a method, an apparatus, and a program for allocating fingers by a path searcher of a RAKE receiver involving detecting multipath regions in a received signal based upon the power delay profile, determining a required number of fingers for each multipath region, determining a number of allocated fingers for each multipath region according to an area-based weighting scheme such that each multipath region that is allocated fewer than its required number of fingers is deemed to have a non-zero residual area, allocating any surplus fingers to multipath regions having non-zero residual areas until either no surplus fingers remain or each multipath region is allocated its required number of fingers, and assigning delay values to or placing the allocated fingers within the multipath region.

Determining the number of allocated fingers for each multipath region according to an area-based weighting scheme typically involves determining the power delay profile function area under each multipath region, determining a fractional area for each multipath region based upon the area under each multipath region, and dividing a plurality of available fingers according to the fractional area of each multipath region, where determining a fractional area for a multipath region based upon the area under each multipath region involves determining a sum of all multipath region areas and dividing the area under the multipath region by the sum of all multipath region areas. Allocating any surplus fingers typically involves allocating any surplus fingers based upon the magnitude of the residual area for all multipath regions that have non-zero residual areas.

Placing any fingers allocated to a multipath region typically involves placing a finger at a peak of the multipath region, if the multipath region is allocated exactly one finger; placing a first finger at the first path of the multipath region and placing a second finger at the last path of the multipath region, if the multipath region is allocated at least two fingers; and placing the remaining fingers uniformly in a remaining span width, if the multipath region is allocated more than two fingers. For an un-resolvable multipath region, placing a first finger at a first path of the multipath region and placing a second finger at a last path of the multipath region may involve placing the first finger at a StartIndex+$\Delta_o$ and placing the second finger at a StartIndex+LengthofSpan−1−$\Delta_o$, wherein StartIndex is the starting index for the multipath region, LengthofSpan is the length of the multipath region, and $\Delta_o$ is the predetermined offset to find the first path on the edges of the multipath region. The value $\Delta_o$ is typically a configurable parameter based upon a sampling rate of the multipath receiver. Within a multipath region, the fingers are typically placed in such a way that there is at least a predetermined minimum separation between fingers.

Detecting multipath regions in the received signal typically involves determining the power delay profile function from the received signal and detecting multipath regions as the regions in power delay profile function that are above a certain pre-determined threshold value.

DETAILED DESCRIPTION OF A PREFERRED EMBODIMENT

Embodiments of the present invention employ a path searcher algorithm. The path searcher algorithm is described herein with reference to 3GPP WCDMA systems. However, the concepts can be directly applied to any other systems using either the pilot channel or the pilot bits.

A data-aided path searching algorithm is presented. The data-aided path searching algorithm assumes known data on either the Common Pilot Channel (CPICH) or as the dedicated pilot symbols inserted in the data (DPCH) channel.

Figure 1:
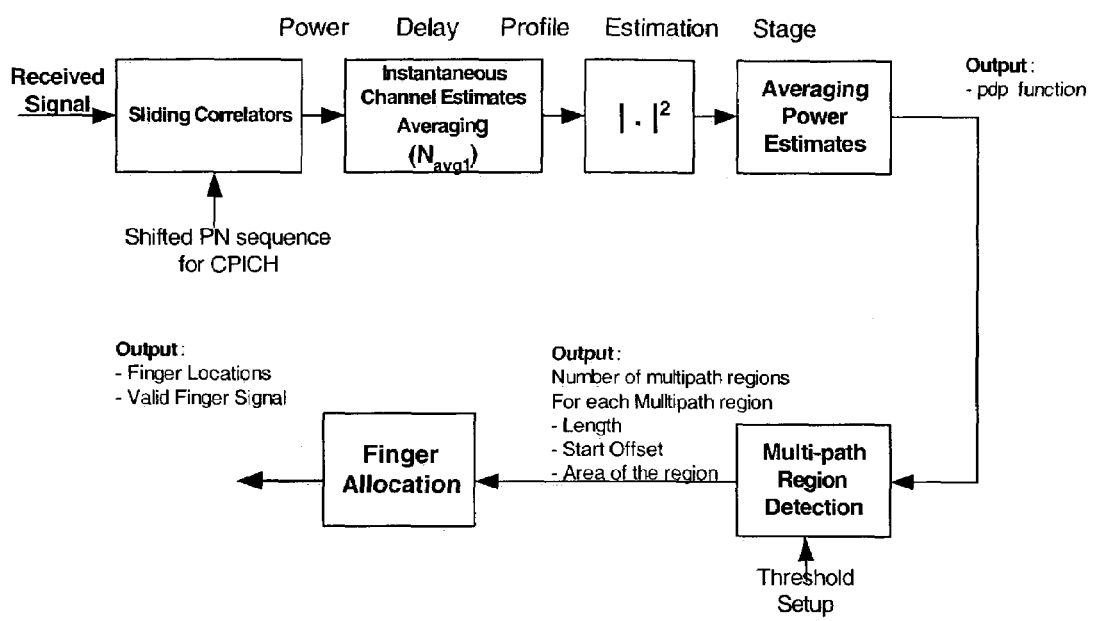
FIG. 1 is a block diagram showing the relevant logic blocks for the data-aided path searching scheme.

FIG. 1 is the block diagram showing the relevant logic blocks for the data-aided path searching algorithm. As shown in FIG. 1, the data-aided path searching algorithm includes a power delay profile estimation stage, a multipath region detection stage, and a finger allocation stage.

The received signal model can be described using the following equation:

$$r(t) = h(t) \otimes x(t) + n(t),$$

where "$\otimes$" denotes the convolution process, x(t) is the transmitted data on the channel of interest, and h(t) is the multipath channel impulse response given by:

$$h(t) = \sum_{l=1}^{L} \alpha_l(t) \delta(t - \tau_l),$$

where $\alpha_l(t)$ denotes the time varying channel coefficient for a path with delay $\tau_l$, L denotes the total number of paths, and n(t) represents the noise plus the interference term. In a CDMA signal model, n(t) is the sum of white noise and signal from other users and channels. The path searcher estimates the number of paths, L, and the respective delays, $\tau_l$. A data aided algorithm is used for path searching, since the known data is available either on the Common Pilot Channel (CPICH) or as the pilot symbols inserted in the DPCH channel in the 3GPP downlink signal. Thus, in the above signal model, x(t) consists of known data on the CPICH channel.

The first step in the data-aided path search scheme is to compute the power delay profile from received signal [Ref 1][Ref 2][Ref 3][Ref 4]. Specifically, a hypothesis is constructed that for each delay within a certain window, there exists a path. For each hypothesis, the power of each path, defined as $|\alpha_l|^2$, is estimated. The estimated power for each (hypothesized) path forms an estimate of channel power delay profile. A two stage averaging, as suggested in [Ref 1][Ref 2], is employed to reduce noise from the estimate of channel power delay profile.

The estimated delay profile is passed through a multipath region detector to separate out multipath and non-multipath regions. Detecting all paths with sufficiently high SIR will help increase diversity gain. However, false detection could lead to unnecessary increase in number of fingers, thus leading to higher power consumption without any significant increase (or even a degradation) in performance. This suggests the use of a threshold to reject multipaths having low SIR.

After multipath region detection, finger allocation is used to assign path delay values to the RAKE fingers based on the detected multipath regions. The difficulties in finger allocation are mainly attributable to un-resolvable multipaths and to limited number of resources (fingers). A good finger allocation strategy ties to divide the total available resources among different multipaths (or groups of multipaths) in such a way to pick up the maximum signal energy.

Exemplary power delay profile estimation, multipath region detection, and finger allocation techniques are described in detail below.

Power delay profile (pdp) function describes the distribution of power in the paths arriving at different time delays. Let $F_{dp}(n)$ denote the power delay profile function at a time delay of 'n' samples (i.e., it represents the power of the path arriving at a time delay of 'n' samples). It can be perceived as the test statistic on the basis of which it will be decided whether a path with significant power is present at a time delay of 'n' samples or not. Let $N_M$ denote the maximum number of samples for which power delay profile needs to be computed. $N_M$ generally depends on the multipath spread of the channel and is a design parameter.

For each value $n=0 \ldots N_M$, $F_{dp}(n)$ is computed as follows.

First, the instantaneous amplitudes for CPICH symbols are computed. This is done by correlating with the shifted CPICH PN sequence. The amount of shift is equal to 'n' samples. The PN sequence is generated by multiplying the CPICH OVSF code with the scrambling code. Since the data on CPICH channel is all ones, the instantaneous amplitudes are same as the instantaneous channel estimates under the given hypothesis Let r(t), denote the received signal after passing through Root Raised Cosine filter and let c(t), denote the CPICH PN Sequence. Define, $C_1(n,i)$ as the output of the correlator for the $i^{th}$ symbol. In this section we'll refer to this quantity as the instantaneous channel estimates under the given hypothesis. Then, compute:

$$C_1(n, i) = \sum_{k=0}^{SF-1} r((i*SF + k)*Ns + n)*c^*(i*SF + k),$$

where SF denotes the CPICH spreading factor and Ns denotes the oversampling factor per chip and (.)*denotes the complex conjugation operation.

Next, the average of $N_{avg1}$ consecutive instantaneous channel estimates are computed as follows:

$$C_{CA}(n, j) = \sum_{i=0}^{N_{avg1}-1} C_1(n, (j*N_{avg1} + i)),$$

where, $C_{CA}(n,j)$ denotes the averaged channel estimate for the $j^{th}$ symbol block. This constitutes the first of the two stage averaging process as mentioned above.

Next, the average power in the path with time delay 'n' samples is computed by squaring the averaged estimate obtained after the previous step.

Next, another averaging process is applied to this power estimate to further reduce noise from the delay profile estimate. This averaging constitutes the second stage of averaging and can be a simple averaging operation [Ref 1] or a weighted averaging operation [Ref 2]. For a simple averaging, we make use of $N_{avg2}$ consecutive power estimates. Thus $F_{dp}(n)$ is given by:

$$F_{dp}(n) = \sum_{j=0}^{N_{avg2}-1} |C_{CA}(n, j)|^2$$

Figure 2:
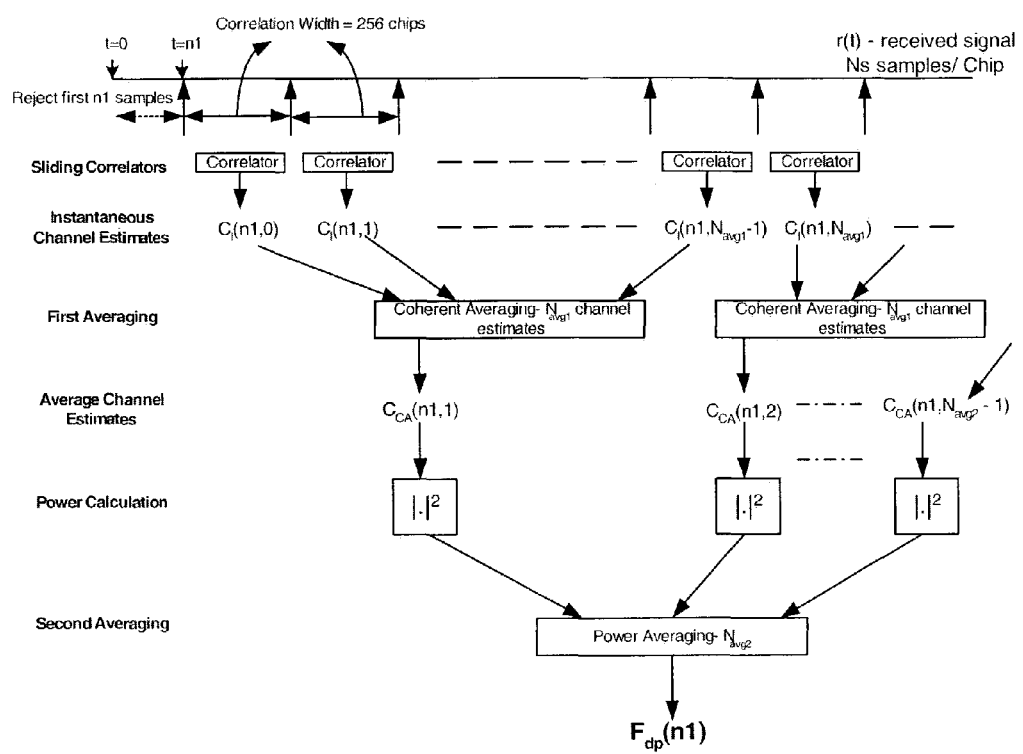
FIG. 2 demonstrates the process for finding the power delay profile.

FIG. 2 demonstrates the process for finding the power delay profile.

A number of factors affect the coherent averaging lengths.

Figure 3:
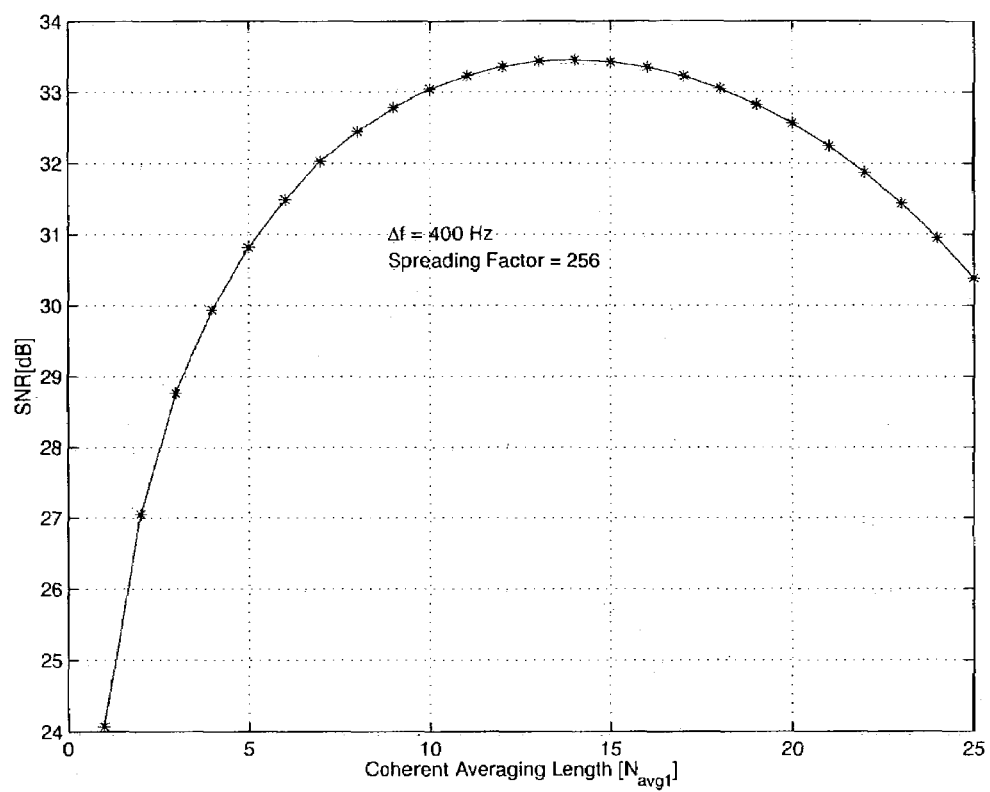
FIG. 3 shows the effect of coherent averaging on SNR in the presence of frequency error.

Increasing $N_{avg1}$ increases SNR by a factor of $N_{avg1}*256$ due to an effective increase in spreading gain, but SNR degrades due to the presence of frequency error. The degradation of signal power due to a frequency error, $\Delta f$, is given by [Ref 5]:

$$D(\Delta f) = \left[ \frac{\sin(\pi*Sf*N_{avg1}*\Delta f*T_c)}{\pi*Sf*N_{avg1}*\Delta f*T_c} \right]^2$$

where Sf is the spreading factor. The frequency error can be present because of crystal inaccuracies and the Doppler spread. The net effect is shown in FIG. 3, for $\Delta f$=400 Hz.

For a velocity of 50 km/hr, the total maximum frequency error in a 3GPP system is expected to be <400 Hz. For $\Delta f$=400 Hz, the breakeven point is at $N_{avg1}$=14. Thus, power delay profile estimation typically uses $N_{avg1}$=[10, 15] symbols.

The total length of data required for path searcher algorithm depends directly on averaging lengths. Thus, another factor affecting the averaging lengths is the frequency at which path search algorithm will be invoked. One run of path searcher algorithm should be over before the next one starts.

Figure 4:
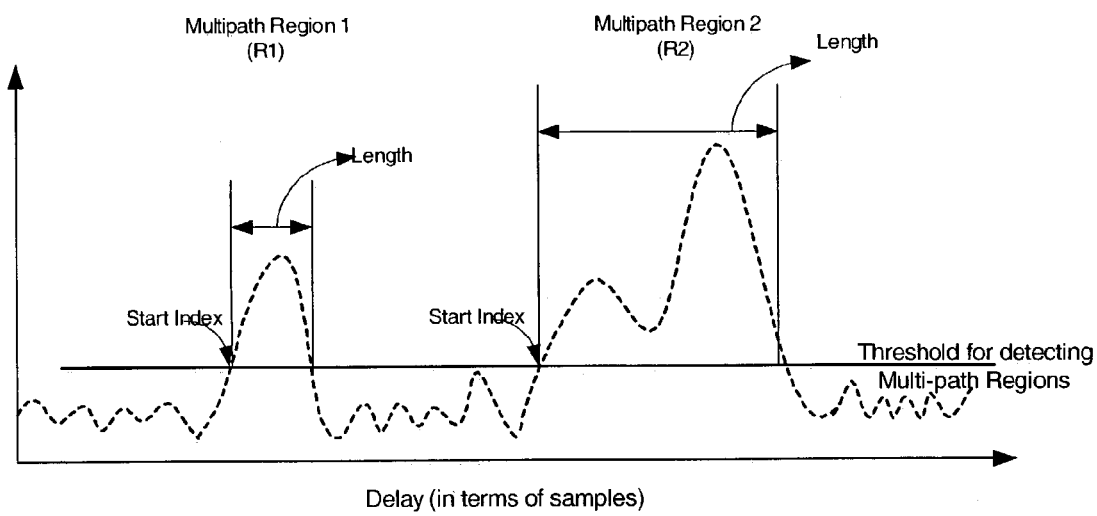
FIG. 4 shows the power delay profile and multipath detection process by thresholding.

The estimated power delay profile (pdp) function is a discreet valued function, and a typical envelope of estimated power delay profile function is shown in FIG. 4 (dotted function). The estimated pdp function consists of multipath regions and non-multipath regions. Because of the multiple access interference, white noise and the leakage due to the side lobes of autocorrelation function (FIG. 5), the estimated pdp function in the non-multipath regions is non-zero. A thresholding technique is used to separate the multipath and non-multipath regions. At every delay value, the estimated pdp function is compared to a threshold and all the values below the threshold are discarded as noise. A multipath region is defined as a contiguous region where the estimated pdp values are greater than the threshold. Each multipath region is detected and characterized in terms of a starting index of a multipath region ($N_k$), a length of the multipath region ($L_k$), and an area of the multipath region ($A_k$), where k denoted the index of the multipath region. Thresholding also reduces the amount of data passed to the next stage of path searcher. One consideration when choosing a particular method or a combination of thresholding methods is the implications of the threshold itself. A low threshold implies more false alarms because many of the noise regions can be classified as the multipath regions. On the other hand, a very high threshold implies a high probability of missing out the actual multipath region. A good thresholding technique should balance between the probability of miss and the probability of false alarm.

Another consideration when choosing a particular method or a combination of thresholding methods is the amount of data passed between the pdp estimation stage and the finger allocation stage. Ideally, only the data for multipath regions should be passed to the finger allocation stage. The amount of data can be very critical during the soft handoff mode of operation.

Based on the above considerations the following methods for thresholding are used.

One exemplary thresholding technique (referred to hereinafter as Threshold1) is relative to the peak of the pdp function. In this method:

$$\tau = \max_n [F_{dp}(n)] * 10^{(-LevelBelowPeak/10)}$$

where, $F_{dp}(n)$ is the estimated power delay profile function and 'LevelBelowPeak' is a configurable parameter. This method is based on the fact that multipaths with low signal to interference noise ratio do not affect the performance. In a RAKE receiver, the fingers with power 10 dB below the maximum finger do not affect the performance significantly. Thus, LevelBelowPeak is typically selected to be around 10 dB. One drawback of this method is that it is based on signal strength only, so when all the multipaths are in deep fades, this method tends to classify noisy regions as multipath regions, which can lead to degraded performance and increased power consumption. Another drawback of this method is that finding the threshold requires the availability of estimated power delay profile function at all delay values. Another drawback of this method is that it is unable to detect a no signal situation or a complete loss of synchronization.

Another exemplary thresholding technique (referred to hereinafter as Threshold2) is relative to the noise level in the pdp function. In this method, the signal part is removed from the estimated power delay profile (e.g., remove the main lobes for the 6 strongest paths—the remaining power delay profile function can be considered as noise only), the mean and variance of the noise part of the power delay profile function are estimated, and the threshold is chosen according to:

$$\tau = \mu_n + \text{ThreshRange} * \sigma_n$$

where $\mu_n$ and $\sigma_n$ are the mean and standard deviation of the noise only part of the power delay profile function. ThreshRange is a configurable parameter and its value will be decided using simulations. This method is able to detect a low (or no) signal condition. Also, the noise statistics in general remain the same over adjacent frames so the threshold calculated in the previous frame can be used for the next frame. Thus, one need not wait for the full power delay profile function to be computed for finding the threshold.

Finger Allocation is the process of assigning the RAKE fingers to the detected multipaths. The difficulties in finger allocation are mainly attributed to un-resolvable multipaths and limited number of resources (fingers). A good finger allocation strategy divides the total available resources amongst different multipaths (or groups of multipaths) in such a way to pick up the maximum signal energy.

Figure 5:
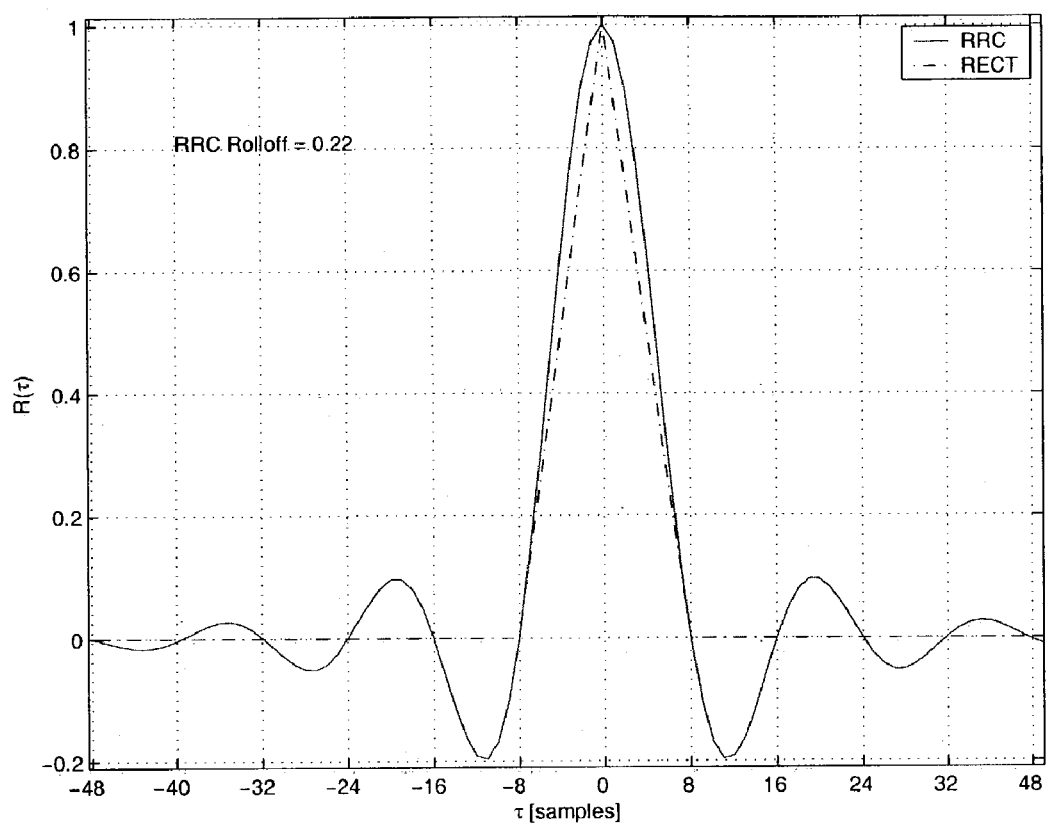
FIG. 5 shows autocorrelation functions for a RRC pulse and a rectangular pulse.

The resolvability of the two multipaths using the power delay profile estimation depends on the auto-correlation function of the transmitted pulse shape. The autocorrelation functions for a rectangular pulse and an RRC pulse with roll off factor 0.22 are shown in FIG. 5. Due to the time spread of the autocorrelation functions, the estimated power delay profile function will show only one peak even if the delays of successive paths differ by small amount (smearing due to broad main lobe). The minimum separation required by a rectangular pulse to be able to differentiate two paths is one chip period where as for a RRC pulse the minimum separation required is a little more than one chip period. This is because RRC autocorrelation function introduces more time-spreading because of the band-limited nature of the RRC pulse as compared to the rectangular pulse. Thus, although an RRC pulse leads to good spectrum properties it results in a reduced multipath resolution.

Using simulations, it can be established that for an RRC pulse with roll-off factor of 0.22, the multipath resolution is approximately equal to $1.5*T_c$, where $T_c$ is the chip period. Although the paths are unresolvable and hence exact path locations cannot be found out, there is still advantage in assigning multiple fingers to pick up some of the diversity gain.

The finger allocation scheme for an un-resolvable multipath scenario is presented below first with reference to an ideal situation in which there are an unlimited number of resources (fingers) and then with reference to the more realistic situation in which there are a limited number of resources (fingers). The discussion below does not depend on the sampling rate. However, the specific numbers quoted are based on a sampling rate of 8*ChipRate. $L_k$, $N_k$, $A_k$ refer to the length, starting offset, and area of each multipath region with index k, respectively. Some "rules" are presented for allocating fingers under certain circumstances. These "rules" represent guidelines for allocating fingers in exemplary embodiments of the present invention, and the present invention is not limited to or by these "rules."

Ideally, let there be an unlimited number of resources (fingers) for finger allocation. The following five rules are derived for the ideal case.

Rule 1: If $L_k <= L_0$, Assign One Finger to the Multipath Region and Place the Finger at the Peak. $L_0$ is a Configurable Parameter.

This rule differentiates between a resolvable path (one or many closely spaced paths) and an unresolvable multipath scenario. Very closely spaced paths imply high correlation that reduces the diversity gain [Ref 6]. Such a case can be treated as a single path case and one finger should be enough to collect the energy of all the paths.

Observing a no noise case for a single path gives an idea of the parameter $L_0$. In a no noise case, a single path appears as a multipath region with a main lobe width of 15 samples (time broadening effect). Thus, approximately $L_0 \approx 15$. Experiments indicate that the typical multipath region length for a single path (in the presence of noise and other 3GPP channels) 11 or 13 samples.

Rule 2: For an Un-Resolvable Multipath Scenario, $L_k > L_0$, Multiple Fingers Should be Used for Demodulation. The Peaks within a Multipath Region do not Necessarily Correspond to the Path Location.

As described above, the unresolvable multipath scenario occurs whenever path separation is less than $1.5*T_c$. Although this implies correlated paths, there is still some inherent diversity gain to be realized [Ref 6]. In fact, there is a significant diversity advantage until the path spacing becomes too small (<quarter of a chip). By placing multiple fingers, this diversity advantage can be exploited. Since the actual path locations cannot be resolved, the finger placement might not coincide with the true path locations and the achieved performance might fall short of the best that can be achieved when the path locations are known. Although not the best, performance is still gained compared to the case when fingers are assigned only to the peaks. Changing peak positions due to adjacent unresolvable multipaths is another reason for not placing individual fingers on peaks [Rule 5].

Rule 3: In an Un-Resolvable Multipath Scenario, the Path Location on the Edges of the Multipath Region can be Predicted Approximately. The First Path of the Region Occurs at Approximately $N_k + \Delta_0$ and the Last Path Occurs at $N_k + L_k - \Delta_0 - 1$. $\Delta_0$ is a Configurable Parameter.

Figure 6:
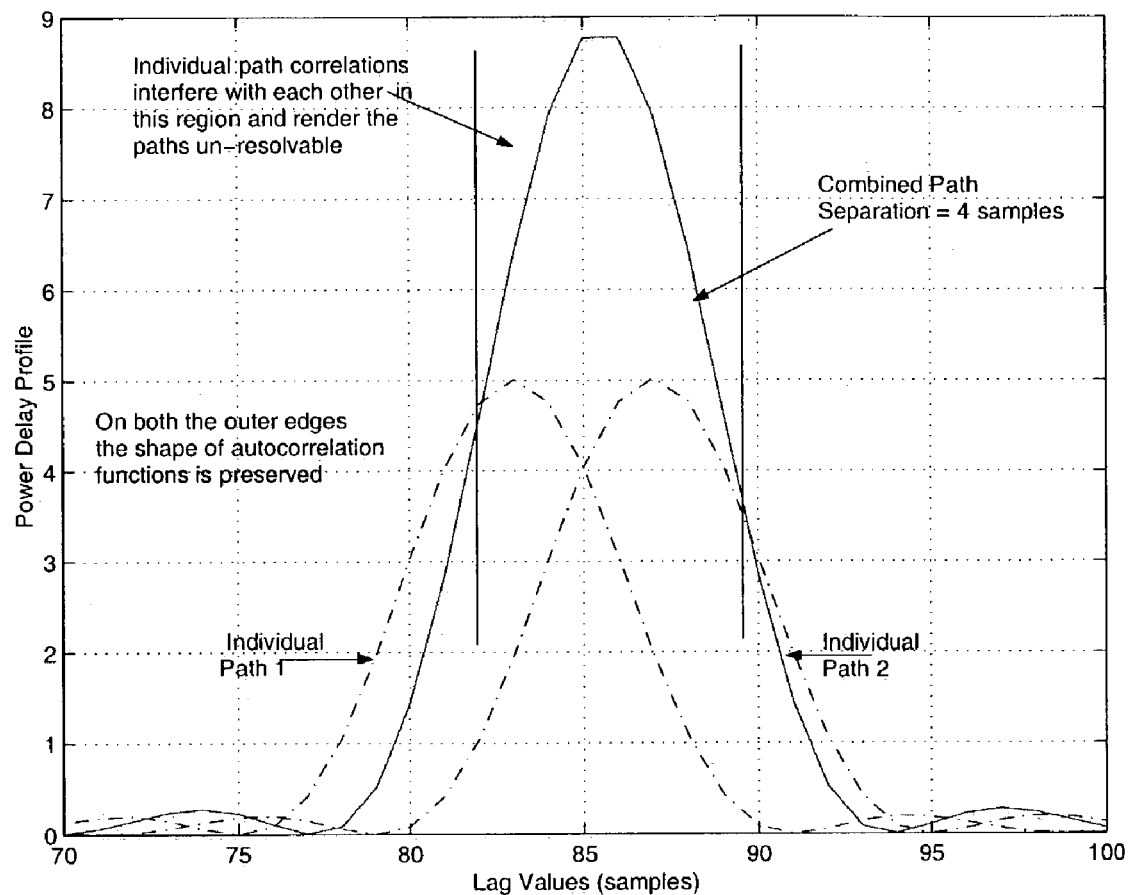
FIG. 6 shows the power delay profile for two closely spaced multipaths.

This rule can be explained with reference to FIG. 6, which depicts the estimated power delay profile of two multipaths separated by half a chip period (un-resolvable scenario). The experiment was set up with no white noise and CPICH channel only. It also depicts the estimated power delay profile functions if only the individual paths are present. When both paths are present, only one peak is observed. That is due to the interaction of two closely spaced main lobes of the pulse autocorrelation function of individual paths. However, on the outer edges, the autocorrelation functions of individual paths are almost preserved and this fact can be used to get an approximate idea of the path location.

Typically, for a sample rate of 8 times the chip rate, it is observed that, for a single path, the multipath region length is 11 (or 13) and the peak occurs at with an offset of 5 (or 6) from the starting index. Thus, $\Delta_0 \approx 5$ can be used to approximate the location of the first multipath in an un-resolvable scenario.

The fact that the pulse autocorrelation functions are symmetric can be used to approximate the location of the last path in the un-resolvable multipath region. This idea can be very helpful in the cases of 2 unresolvable paths, since it becomes possible to almost resolve both the paths. Using the iterative techniques of regeneration and subtraction, it is possible to approximately determine all of the multipath locations in an un-resolvable path scenario.

Rule 4: Two Demodulation Fingers should have a Minimum Separation of $\Delta_s$ Samples. $\Delta_s$ is a Configurable Parameter.

This rule specifies the minimum allowable separation between two demodulation fingers in an un-resolvable multipath scenario. It follows from the following observations. First, high correlation between fingers tends to nullify the diversity advantage we hope to gain by placing multiple fingers. Second, channel estimation will become worse because of the correlation in noise samples. Noise whitening is one of the possible solutions to rectify it but that might require additional computation. Also an inaccurate estimation of noise correlation matrices might lead to instability problems [Ref 9].

For a RRC pulse with a roll off factor of 0.22, for a lag>=6 samples, the magnitude of autocorrelation function is less than 11 dB (FIG. 5) of the peak value. Thus the noise can be assumed uncorrelated for $\Delta_s$>=6.

Rule 5: Fingers Placed for the Unresolvable Multipath Regions Should not be Tracked Individually Using the Traditional Early-Late Tracking Loop.

Intuitively, tracking follows the initial acquisition process. In the un-resolvable multipath scenarios, tracking individual finger is not a good idea since the fingers are not allocated to the actual path locations. The following problems encountered with the traditional early-late tracking justify the above rule. First, adjacent fingers tend to lock onto the same nearest peak if each finger is tracked individually [Ref 7][Ref 9] (i.e., finger collapsing). Second, the rate of change of channel coefficients is typically much faster than the timing drift of multipaths. If the multipaths are un-resolvable, the adjacent paths add constructively or destructively resulting in a rapidly changing peak positions. Thus, the RAKE fingers (which have collapsed to a peak) are subject to a lot of timing jitter. Thus instead of individually tracked fingers multiple fractional-chip spaced fingers are assigned. The tracking can be done for the group as a whole rather than for each finger [Ref 10].

Rules 1, 2, 3, and 4 specify the required number of fingers for each multipath region in an unlimited resource scenario. The complete listing for each multipath region is referred to hereinafter as the Required Finger Table. In an ideal case, the above rules completely specify the finger placements.

In actual implementations, there are a limited number of fingers. A limited number of fingers imply some sort of a priority structure for allocating fingers per multipath region. In an exemplary embodiment of the present invention, the area ($A_k$) under each multipath region k is used to divide the available fingers amongst different multipath regions. The area under each multipath region is indicative of the total power of all the multipaths falling in the region. Area includes the effect of the number of multipaths (length of the region) and power of individual paths (magnitude of power delay profile). The available fingers are typically divided according to the fractional area of each multipath region, $$\frac{A_k}{\sum_k A_k}.$$

In case of deficient fingers (i.e., allocated<required), residual area, $$A_k[1-(\text{allocated/required})]$$

forms a very good criterion for distributing the surplus fingers among the deficient regions, as described below.

Some additional rules are presented for the limited resource cases.

Rule 6: If the Allocated Fingers>=Required Fingers Place the Fingers According to Ideal Placement Rules.

Rule 7: Allocated Fingers<Required Fingers. Number of Allocated Fingers=1, Place it at the Peak of the Multipath Region.

From the simulations, it is observed that, out of the possible single finger placements, the RAKE with finger placed at the peak performs better than other alternatives.

Rule 8: Allocated Fingers<Required Fingers and Allocated Fingers>1. Rules 1, 2, 3, and 4 are Still Valid. In Principle, however, $\Delta_s$ might need to be Increased to Fit the Fingers Uniformly to the Length of Multipath Region.

In an embodiment of the present invention, multiple allocation passes may be used to distribute the fingers.

A single complete finger is actually equivalent to four fingers or correlators, namely DPCH Demodulation finger, CPICH on-time demodulation finger, CPICH early-time demodulation finger (for DLL), and CPICH late-time demodulation finger (for DLL).

For an unresolvable multipath region with multiple fingers, individual fingers are not tracked (Rule 5), and two fingers may be needed to track the whole group. Thus, for an un-resolvable multipath with N allocated fingers, only 2N+2 individual fingers (instead of 4N) are actually needed, and the fingers used for early-time and late-time tracking can be freed up.

Also there might be a case when the number of allocated fingers is greater than the number of required fingers. This will free up additional fingers (correlators).

In an embodiment of the present invention, multiple allocation passes are performed to re-distribute the freed up fingers among multipath regions with insufficient fingers.

Figure 8:
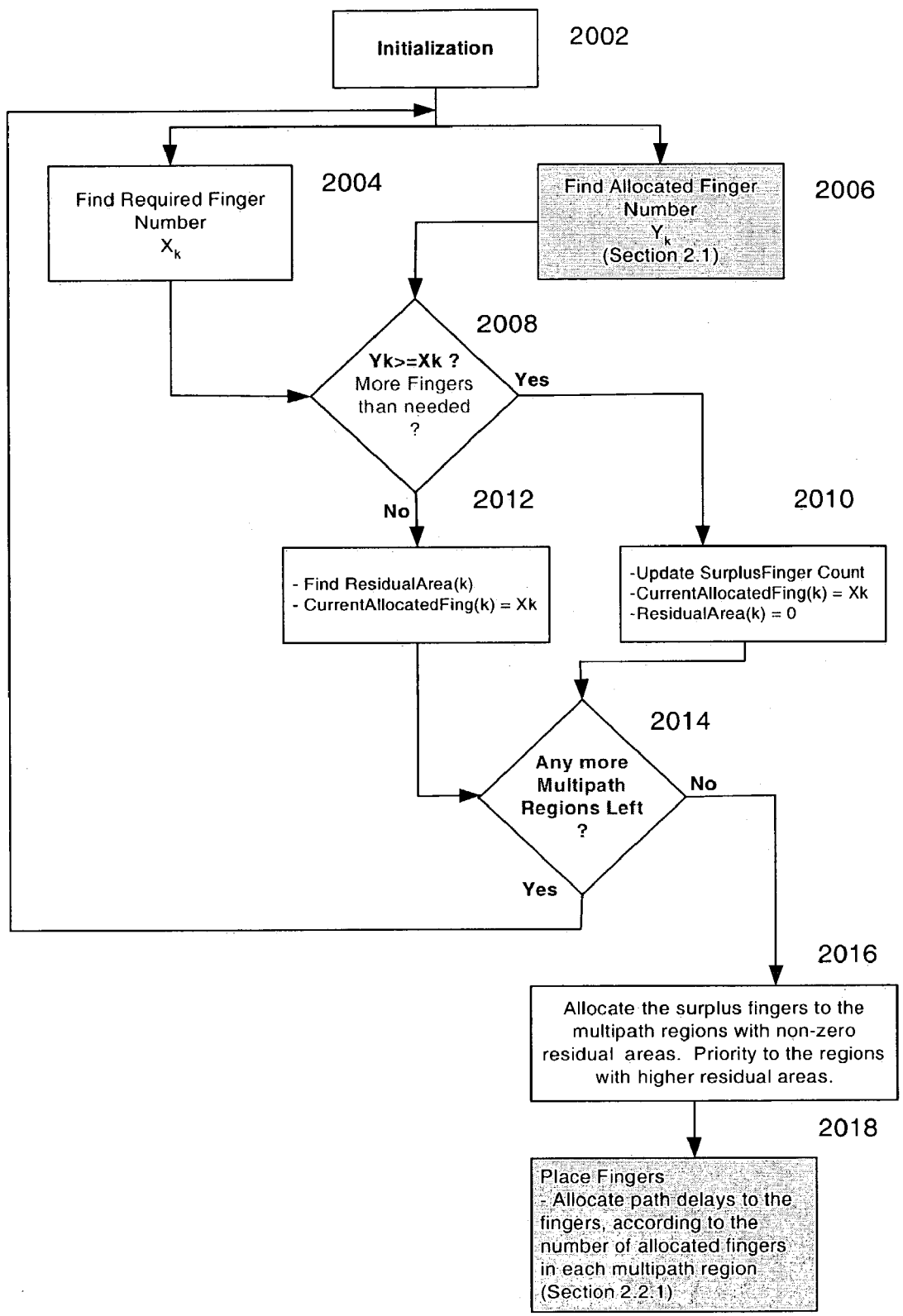
FIG. 8 is a logic flow diagram describing the finger allocation algorithm.

FIG. 8 is a logic flow diagram describing the finger allocation algorithm.

At the start of the finger allocation stage, in block 2002, the number of multipath regions, the length (in terms of samples) of each multipath region, the starting index of each multipath region, the area of each multipath region, and the total number of available fingers (demodulation and tracking) are available. For each region k, the required number of fingers Xk is determined, in block 2004, and the number of allocated fingers Yk for a limited finger scenario is determined, in block 2006. The required number of fingers Xk is determined using the rules specified above. The number of allocated fingers Yk is determined according to the area-based weighting scheme described above. A comparison is made between the allocated fingers and the required number of fingers, in block 2008. If the required number of fingers is less than allocated (YES in block 2008), then the extra fingers are added to the surplus pool, in block 2010. If the required number of fingers is more than allocated (NO in block 2008), then the residual area is calculated based upon the number of deficient fingers, in block 2012. The residual area serves as a criterion for allocating fingers from the surplus finger pool. It should be noted that the above steps are carried out for each detected multipath region via block 2014.

After the above steps have been carried out for all detected multipath regions (NO in block 2014), fingers from the surplus pool are allocated to the finger-deficient regions (i.e., regions with non-zero residual areas), in block 2016. Priority is given to the regions with the higher residual areas. This process continues until either all the surplus fingers have been allocated or all the multipath regions have the required number of fingers. Finally, in block 2018, the fingers are placed i.e. delay values are assigned to the fingers allocated to each multipath region.

The following is a summary of the path searcher algorithm describing multipath detection process and the finger allocation strategy presented as pseudo-code. This strategy is based on the allocation rules described above.

Step 0: Power Delay profile Computation
Compute power delay profile for a given delay span Step 1: Thresholding Phase
Find threshold
Remove the delay values that do not clear the threshold Step 2: Find and Characterize the Multipath regions Denote the $k^{th}$ multipath region by $I_k$
Find $I_k$ as a contiguous interval where pdp function clears threshold
Characterize $I_k$, in terms of
Starting Index ($N_k$)

$(F_{dp}(N_k-1)==0$ and $F_{dp}(N_k)>0)$

Length of the span ($L_k$)
Count from the Starting index till $F_{dp}(N_k+L_k)==0$
Area of the span ($A_k$)

$$A_k = \sum_{i=0}^{L_k-1} F_{dp}(N_k + i)$$

Step 3: Required and Allocated Finger Table

Let the required number of fingers for a $k^{th}$ multipath region be denoted by $X_k$. Let the allocated number of fingers be denoted by $Y_k$. For each k (k is the index of multipath region):
Find the required number of fingers, $X_k$.
If ($L_k<C(\alpha_o,\Delta_s)$)
$X_k=1$
else $X_k=\lfloor [L_k-C(\Delta_o,\Delta_s)-1]/\Delta_s \rfloor+2,$ where $\lfloor . \rfloor$ represents a flooring operation.

$C(\Delta_o,\Delta_s)=2\Delta_o+\Delta_s-\lfloor \Delta_s/2 \rfloor+1,$ and $\Delta_o$: Offset to compensate the starting and falling edges of the RC pulse [Rule 3]
$\Delta_s$: Minimum separation between two fingers [Rule 4]
Note: If oversampling factor is 8/chip then typically, $\Delta_o=5$ and $\Delta_s=6$ Find the allocated number of fingers, $Y_k$ $$SoftY_k = \frac{A_k}{\sum_k A_k} * N_f, \text{ and } Y_k = \lfloor SoftY_k \rfloor.$$

$N_f$ is the number of available fingers
Adjust the remaining fingers by allocating in the order of residual $SoftY_k$.

Step 4: Allocation Strategy
Assumptions:
A Group of fingers is allocated for unresolvable paths scenario [Rule 2]
For group of fingers, individual finger tracking is switched off [Rule 5]

2 fingers will be allocated per group for tracking the group as a whole

```
/* First Pass */
if (4Y_k >= 2X_k + 2)
{
    ResidualArea(k) = 0
    SurplusFingers += 4Y_k - 2X_k - 2
    CurrentAlloc(k) = X_k
}
else
{
    ResidualArea(k) = A_k (1 - Y_k/X_k);
    CurrentAlloc(k) = Y_k; /* Current Allocated Fingers */
}
/* Allocate Surplus Finger according to the 'WaterFilling Model' */
While (SurplusFingers > 0)
{
    Find j, such that ResidualArea(j) = max (ResidualArea(k));
    If (CurrentAlloc(j) == 0)
    {
        If (SurplusFingers < 4)
        {
            ResidualArea(j) = 0;
            Continue;
        }
        else
        {
            CurrentAlloc(j) += 1;
            SurplusFingers += -4;
            ResidualArea(j) += -A_k/X_k;
        }
    }
    else
    {
        CurrentAlloc(j) += 1;
        SurplusFingers += -2;
        ResidualArea(j) += -A_k/X_k;
    }
} /* End While*/
/* Actually Place Fingers */
For all spans,
PlaceFingers(N_k, L_k, CurrentAlloc(k), Δ_s);
Function PlaceFingers(StartIndex, LengthofSpan, NumberofFingers, Δ_1)
    If (NumberofFingers == 1) [Rule 1, Rule 7]
    {
        Place at the peak
    }
    If (NumberofFingers == 2)[Rule 3]
    {
        Place first finger at StartIndex+ Δ_0
        Place second finger at StartIndex + LengthofSpan - 1 - Δ_0
    }
    If (NumberofFingers > 2)[Rule 2, Rule 3, Rule 4, Rule 8]
    {
        Place first finger at N_k+ Δ_0
        Place last finger at N_k+ L_k - 1 - Δ_0
        Place remaining Fingers uniformly in the remaining span width
    }
```

Figure 7:
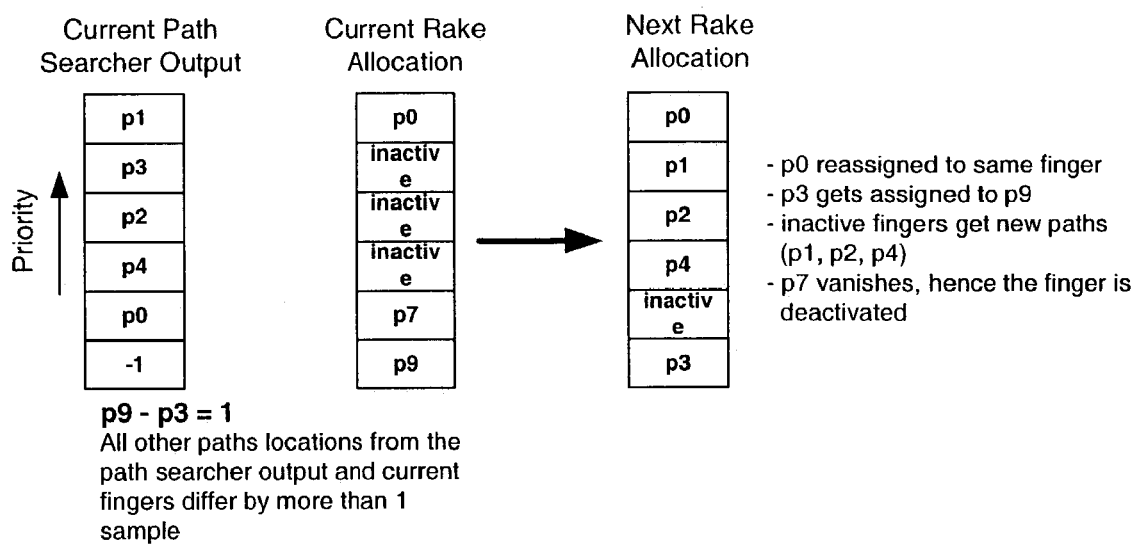
FIG. 7 demonstrates the reassignment of RAKE fingers between successive path searcher runs.

Finger assignment is a continuous task, and each path searcher run might require assignment of a new path or a de-allocation of a previously active path. The path searcher algorithm always outputs prioritized path locations. It might happen that a path appears in two successive runs of path searcher but with a different priority. The finger allocation algorithm must not assign a different finger for this path. This might affect the algorithms like channel estimation or DLL that have transients in their response. The current finger allocation should be monitored and only new paths should be assigned to the inactive or available fingers. This process is demonstrated in FIG. 7.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, of compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for allocating RAKE receiver fingers among a plurality of multipath regions in a received signal, the method comprising:
   determining a required number of fingers for each multipath region;
   determining an allocated number of fingers for each multipath region according to an area-based weighting scheme;
   allocating a number of fingers to each multipath region based on the required number of fingers and the allocated number of fingers such that any multipath region that is allocated fewer than its required number of fingers is deemed to have a non-zero residual area;
   allocating any surplus fingers to any multipath regions having non-zero residual areas until either no surplus fingers remain or each multipath region is allocated its required number of fingers; and
   placing any fingers allocated to each multipath region within the multipath region.

2. The method of claim 1, wherein determining an allocated number of fingers for each multipath region according to an area-based weighting scheme comprises:
   determining an area under each multipath region;
   determining a fractional area for each multipath region based upon the area under each multipath region; and
   dividing a plurality of available fingers according to the fractional area of each multipath region in such a way that no multipath region is allocated more than its required number of fingers.

3. The method of claim 2, wherein determining a fractional area for a multipath region based upon the area under each multipath region comprises:
   determining a sum of all multipath region areas; and
   dividing the area under the multipath region by the sum of all multipath region areas.

4. The method of claim 1, wherein allocating any surplus fingers comprises:
   allocating any surplus fingers based upon the magnitude of the residual area for all multipath regions having non-zero residual areas.

5. The method of claim 1, wherein placing any fingers allocated to a multipath region comprises:
   placing a finger at a peak of the multipath region, if the multipath region is allocated exactly one finger; and placing a first finger at the first path of the multipath region, placing a second finger at the last path of the multipath region, and placing any remaining fingers uniformly in a remaining span width, if the multipath region is allocated at least two fingers.

6. The method of claim 5, wherein placing a first finger at a first path of the multipath region and placing a second finger at a last path of the multipath region comprises:

placing the first finger at a StartIndex+$\Delta_o$; and placing the second finger at a StartIndex+LengthofSpan−1−$\Delta_o$, wherein StartIndex is a starting index for the multipath region, LengthofSpan is a length of the multipath region, and $\Delta_o$ is a predetermined offset to find the first path on the edges of the multipath region.

7. The method of claim 1, wherein placing any fingers allocated to a multipath region comprises:

placing any fingers allocated to the multipath region in such a way that there is at least a predetermined minimum separation between fingers.

8. The method of claim 1, wherein:

each multipath region k is a contiguous interval characterized by a starting index $N_k$, a length $L_k$, and an area $$A_k = \sum_{i=0}^{L_k-1} F_{dp}(N_k + i),$$

where $F_{dp}(N_k+i)$ denotes a power delay profile function at a time delay of 'i' samples from the starting index $N_k$;

determining the required number of fingers for each multipath region comprises determining a required number of fingers $X_k$ for each multipath region k such that $X_k=1$ if ($L_k<C(\Delta_o,\Delta_s)$) and otherwise $X_k=\lfloor[L_k−C(\Delta_o,\Delta_s)−1]/\Delta_s\rfloor+2$, where $\lfloor.\rfloor$ represents a flooring operation, $C(\Delta_o,\Delta_s)=2\Delta_o+\Delta_s−\lfloor\Delta_s/2\rfloor+1$, $\Delta_o$ is an offset to compensate the starting and falling edges of the RC pulse, and $\Delta_s$ is the minimum separation between two fingers;

determining the allocated number of fingers for each multipath region comprises determining an allocated number of fingers $Y_k$ for each multipath region k such that $Y_k=\lfloor softY_k \rfloor$, where $$SoftY_k = \frac{A_k}{\sum_k A_k} * N_f,$$

and $N_f$ is the number of available fingers;

allocating the number of fingers to each multipath region comprises allocating CurrentAlloc(k)=$X_k$ fingers to the multipath region k such that the multipath region k has a residual area ResidualArea(k)=0 and increasing a number of surplus fingers SurplusFingers by $4Y_k−2X_k−2$, if $4Y_k>=2X_k+2$, and otherwise allocating $Y_k$ fingers to the multipath region k such that the multipath region k has a residual area ResidualArea(k)=$A_k(1−Y_k/X_k)$; and allocating any surplus fingers to any multipath regions having non-zero residual areas comprises, while the number of surplus fingers SurplusFingers is greater than zero, iteratively:

finding a multipath region j having the largest residual area;

if the multipath region j is allocated zero fingers and the number of surplus fingers SurplusFingers is less than four, reducing the residual area for the multipath region j such that ResidualArea(j)=0 and reiterating;

if the multipath region j is allocated zero fingers and the number of surplus fingers SurplusFingers is greater than or equal to four, increasing the finger allocation for the multipath region j such that CurrentAlloc(j)+=1, reducing the number of surplus fingers such that SurplusFingers+=−4, reducing the residual area for the multipath region j such that ResidualArea(j)+=−$A_k/X_k$, and reiterating;

if the multipath region j is allocated at least one finger, increasing the finger allocation for the multipath region j such that CurrentAlloc(j)+=1, reducing the number of surplus fingers such that SurplusFingers+=−2, reducing the residual area for the multipath region j such that ResidualArea(j)+=−$A_k/X_k$, and reiterating.

9. An apparatus comprising a RAKE receiver having finger allocation logic for allocating a plurality of fingers among multipath regions of a received signal, wherein the finger allocation logic comprises:

logic for determining a required number of fingers for each multipath region;

logic for determining an allocated number of fingers for each multipath region according to an area-based weighting scheme;

logic for allocating a number of fingers to each multipath region based on the required number of fingers and the allocated number of fingers such that any multipath region that is allocated fewer than its required number of fingers is deemed to have a non-zero residual area;

logic for allocating any surplus fingers to any multipath regions having non-zero residual areas until either no surplus fingers remain or each multipath region is allocated its required number of fingers; and logic for placing any fingers allocated to each multipath region within the multipath region.

10. The apparatus of claim 9, wherein the logic for determining an allocated number of fingers for each multipath region according to an area-based weighting scheme comprises:

logic for determining an area under each multipath region;

logic for determining a fractional area for each multipath region based upon the area under each multipath region; and logic for dividing a plurality of available fingers according to the fractional area of each multipath region in such a way that no multipath region is allocated more than its required number of fingers.

11. The apparatus of claim 10, wherein the logic for determining the fractional area for a multipath region based upon the area under each multipath region comprises:

logic for determining a sum of all multipath region areas; and logic for dividing the area under the multipath region by the sum of all multipath region areas.

12. The apparatus of claim 9, wherein the logic for allocating any surplus fingers comprises:

logic for allocating any surplus fingers based upon the magnitude of the residual area for all multipath regions having non-zero residual areas.

13. The apparatus of claim 9, wherein the logic for placing any fingers allocated to a multipath region comprises:

logic for placing a finger at a peak of the multipath region, if the multipath region is allocated exactly one finger; and logic for placing a first finger substantially at a first path of the multipath region, placing a second finger substantially at a last path of the multipath region, and placing any remaining fingers uniformly in a remaining span width, if the multipath region is allocated at least two fingers.

14. The apparatus of claim 13, wherein:

the first finger is placed at a StartIndex+$\Delta_o$; and the second finger is placed at a StartIndex+LengthofSpan−1−$\Delta_o$, wherein StartIndex is a starting index for the multipath region, LengthofSpan is a length of the multipath region, and A$\Delta_o$ is a predetermined offset to find the first path on the edges of the multipath region.

15. The apparatus of claim 9, wherein the logic for placing any fingers allocated to a multipath region comprises:

logic for placing any fingers allocated to the multipath region in such a way that there is at least a predetermined minimum separation between fingers.

16. The apparatus of claim 9, wherein:

each multipath region k is a contiguous interval characterized by a starting index $N_k$, a length $L_k$, and an area $$A_k = \sum_{i=0}^{L_k-1} F_{dp}(N_k + i),$$

where $F_{dp}(N_k+i)$ denotes a power delay profile function at a time delay of 'i' samples from the starting index $N_k$;

the logic for determining the required number of fingers for each multipath region is operably coupled to determine a required number of fingers $X_k$ for each multipath region k such that $X_k=1$ if ($L_k<C(\Delta_o,\Delta_s)$) and otherwise $$X_k=\lfloor[L_k-C(\Delta_o,\Delta_s)-1]/\Delta_s\rfloor+2,$$

where $\lfloor.\rfloor$ represents a flooring operation, $$C(\Delta_o,\Delta_s)=2\Delta_o+\Delta_s-\lfloor\Delta_s/2\rfloor+1,$$

$\Delta_o$ is an offset to compensate the starting and falling edges of the RC pulse, and $\Delta_s$ is the minimum separation between two fingers;

the logic for determining the allocated number of fingers for each multipath region is operably coupled to determine an allocated number of fingers $Y_k$ for each multipath region k such that $Y_k=\lfloor SoftY_k \rfloor$, where $$SoftY_k = \frac{A_k}{\sum_k A_k} * N_f,$$

and $N_f$ is the number of available fingers;

the logic for allocating the number of fingers to each multipath region is operably coupled to allocate CurrentAlloc(k)=$X_k$ fingers to the multipath region k such that the multipath region k has a residual area ResidualArea(k)=0 and increase a number of surplus fingers SurplusFingers by $4Y_k-2X_k-2$, if $4Y_k>=2X_k+2$, and otherwise allocate $Y_k$ fingers to the multipath region k such that the multipath region k has a residual area ResidualArea(k)=$A_k(1-Y_k/X_k)$; and the logic for allocating any surplus fingers to any multipath regions having non-zero residual areas is operably coupled to, while the number of surplus fingers SurplusFingers is greater than zero, iteratively:

find a multipath region j having the largest residual area;

if the multipath region j is allocated zero fingers and the number of surplus fingers SurplusFingers is less than four, reduce the residual area for the multipath region j such that ResidualArea(j)=0 and reiterate;

if the multipath region j is allocated zero fingers and the number of surplus fingers SurplusFingers is greater than or equal to four, increase the finger allocation for the multipath region j such that CurrentAlloc(j)+=1, reduce the number of surplus fingers such that SurplusFingers+=−4, reduce the residual area for the multipath region j such that ResidualArea(j)+=−$A_k$/$X_k$, and reiterate;

if the multipath region j is allocated at least one finger, increase the finger allocation for the multipath region j such that CurrentAlloc(j)+=1, reduce the number of surplus fingers such that SurplusFingers+=−2, reduce the residual area for the multipath region j such that ResidualArea(j)+=−$A_k$/$X_k$, and reiterate.

17. An apparatus comprising a digital storage medium having embodied therein a program for allocating a plurality of fingers among multipath regions of a received signal in a RAKE receiver, the program comprising:

logic for determining a required number of fingers for each multipath region;

logic for determining an allocated number of fingers for each multipath region according to an area-based weighting scheme;

logic for allocating a number of fingers to each multipath region based on the required number of fingers and the allocated number of fingers such that any multipath region that is allocated fewer than its required number of fingers is deemed to have a non-zero residual area;

logic for allocating any surplus fingers to any multipath regions having non-zero residual areas until either no surplus fingers remain or each multipath region is allocated its required number of fingers; and logic for placing any fingers allocated to each multipath region within the multipath region.

18. The apparatus of claim 17, wherein the logic for determining an allocated number of fingers for each multipath region according to an area-based weighting scheme comprises:

logic for determining an area under each multipath region;

logic for determining a fractional area for each multipath region based upon the area under each multipath region; and logic for dividing a plurality of available fingers according to the fractional area of each multipath region in such a way that no multipath region is allocated more than its required number of fingers.

19. The apparatus of claim 18, wherein the logic for determining the fractional area for a multipath region based upon the area under each multipath region comprises:

logic for determining a sum of all multipath region areas; and logic for dividing the area under the multipath region by the sum of all multipath region areas.

20. The apparatus of claim 17, wherein the logic for allocating any surplus fingers comprises:

logic for allocating any surplus fingers based upon the magnitude of the residual area for all multipath regions having non-zero residual areas.

21. The apparatus of claim 17, wherein the logic for placing any fingers allocated to a multipath region comprises:
- logic for placing a finger at a peak of the multipath region, if the multipath region is allocated exactly one finger; and
- logic for placing a first finger substantially at a first path of the multipath region, placing a second finger substantially at a last path of the multipath region, and placing any remaining fingers uniformly in a remaining span width, if the multipath region is allocated at least two fingers.

22. The apparatus of claim 21, wherein:
the first finger is placed at a StartIndex+$\Delta_o$; and
the second finger is placed at a StartIndex+LengthofSpan−1−$\Delta_o$, wherein StartIndex is a starting index for the multipath region, LengthofSpan is a length of the multipath region, and $\Delta_o$ is a predetermined offset to find the first path on the edges of the multipath region.

23. The apparatus of claim 17, wherein the logic for placing any fingers allocated to a multipath region comprises:
logic for placing any fingers allocated to the multipath region in such a way that there is at least a predetermined minimum separation between fingers.

24. The apparatus of claim 17, wherein:
each multipath region k is a contiguous interval characterized by a starting index $N_k$, a length $L_k$, and an area $$A_k = \sum_{i=0}^{L_k-1} F_{dp}(N_k + i),$$

where $F_{dp}(N_k+i)$ denotes a power delay profile function at a time delay of 'i' samples from the starting index $N_k$;
the logic for determining the required number of fingers for each multipath region is operably coupled to determine a required number of fingers $X_k$ for each multipath region k such that $X_k=1$ if $(L_k<C(\Delta_o,\Delta_s))$ and otherwise $X_k=\lfloor [L_k-C(\Delta_o,\Delta_s)-1]/\Delta_s \rfloor+2,$ where $\lfloor . \rfloor$ represents a flooring operation, $C(\Delta_o,\Delta_s)=2\Delta_o+\Delta_s-\lfloor \Delta_s/2 \rfloor+1,$ $\Delta_o$ is an offset to compensate the starting and falling edges of the RC pulse, and $\Delta_s$ is the minimum separation between two fingers;
the logic for determining the allocated number of fingers for each multipath region is operably coupled to determine an allocated number of fingers $Y_k$ for each multipath region k such that $Y_k=\lfloor SoftY_k \rfloor$, where $$SoftY_k = \frac{A_k}{\sum_k A_k} * N_f,$$

and $N_f$ is the number of available fingers;
the logic for allocating the number of fingers to each multipath region is operably coupled to allocate CurrentAlloc(k)=$X_k$ fingers to the multipath region k such that the multipath region k has a residual area ResidualArea(k)=0 and increase a number of surplus fingers SurplusFingers by $4Y_k-2X_k-2$, if $4Y_k>=2X_k+2$, and otherwise allocate $Y_k$ fingers to the multipath region k such that the multipath region k has a residual area ResidualArea(k)=$A_k(1-Y_k/X_k)$; and
the logic for allocating any surplus fingers to any multipath regions having non-zero residual areas is operably coupled to, while the number of surplus fingers SurplusFingers is greater than zero, iteratively:
find a multipath region j having the largest residual area;
if the multipath region j is allocated zero fingers and the number of surplus fingers SurplusFingers is less than four, reduce the residual area for the multipath region j such that ResidualArea(j)=0 and reiterate;
if the multipath region j is allocated zero fingers and the number of surplus fingers SurplusFingers is greater than or equal to four, increase the finger allocation for the multipath region j such that CurrentAlloc(j)+=1, reduce the number of surplus fingers such that SurplusFingers+=−4, reduce the residual area for the multipath region j such that ResidualArea(j)+=−$A_k$/$X_k$, and reiterate;
if the multipath region j is allocated at least one finger, increase the finger allocation for the multipath region j such that CurrentAlloc(j)+=1, reduce the number of surplus fingers such that SurplusFingers+=−2, reduce the residual area for the multipath region j such that ResidualArea(j)+=−$A_k$/$X_k$, and reiterate.

25. The apparatus of claim 17, further comprising a programmable logic device that operates under controlled of the program, wherein the programmable logic device comprises one of:
a microprocessor;
a digital signal processor; and
a field programmable gate array.

* * * * *

UNITED STATES PATENT AND TRADEMARK OFFICE
CERTIFICATE OF CORRECTION

PATENT NO. : 7,277,474 B2 Page 1 of 1
APPLICATION NO. : 10/625479
DATED : October 2, 2007
INVENTOR(S) : Abhay Sharma et al.

It is certified that error appears in the above-identified patent and that said Letters Patent is hereby corrected as shown below:

Column 17, line 15, "$A\Delta_o$" should be --$\Delta_o$--. The error is shown correctly in the patent application at page 30, line 29.

Column 20, line 44, "controlled" should be --control--. The error is shown correctly in the Supplemental Notice of Allowability dated June 26, 2007, specifically in Item 1, line 10 of the Examiner's Amendment.

Signed and Sealed this

Twenty-fourth Day of June, 2008

JON W. DUDAS
*Director of the United States Patent and Trademark Office*